United States Patent
Hanson et al.

(10) Patent No.: US 7,529,051 B2
(45) Date of Patent: May 5, 2009

(54) COMPENSATION FOR VARIATION IN TIMING SKEW IN A DISC DRIVE DATA STORAGE SYSTEM

(75) Inventors: Reed David Hanson, Chaska, MN (US); Timothy Francis Ellis, Tonka Bay, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 783 days.

(21) Appl. No.: 10/322,994

(22) Filed: Dec. 18, 2002

(65) Prior Publication Data

US 2004/0021971 A1 Feb. 5, 2004

Related U.S. Application Data

(60) Provisional application No. 60/401,100, filed on Aug. 5, 2002.

(51) Int. Cl.
*G11B 5/09* (2006.01)
*G11B 5/596* (2006.01)

(52) U.S. Cl. ...................... 360/51; 360/78.04
(58) Field of Classification Search .................. 360/51, 360/75, 77.08
See application file for complete search history.

(56) References Cited

U.S. PATENT DOCUMENTS

| | | | |
|---|---|---|---|
| 4,087,842 A | 5/1978 | Manly | |
| 4,536,809 A | 8/1985 | Sidman | |
| 4,561,028 A | 12/1985 | Guisinger | |
| 4,896,228 A | 1/1990 | Amakasu et al. | |
| 5,315,456 A | 5/1994 | Hessing et al. | |
| 5,444,583 A | 8/1995 | Ehrlich et al. | |
| 5,559,645 A | 9/1996 | Miyazawa et al. | |
| 5,602,689 A | 2/1997 | Kadlec et al. | |
| 5,617,388 A | 4/1997 | Ishioka et al. | |
| 5,774,299 A * | 6/1998 | Baum et al. | 360/77.08 |
| 5,907,448 A | 5/1999 | Watanabe et al. | |
| 5,936,790 A | 8/1999 | Ho et al. | |
| 5,995,318 A * | 11/1999 | Hasegawa et al. | 360/78.14 |
| 6,078,452 A | 6/2000 | Kittilson et al. | |
| 6,191,904 B1 | 2/2001 | Nguyen et al. | |

(Continued)

FOREIGN PATENT DOCUMENTS

DE 198 46 044 A1 12/1999

(Continued)

*Primary Examiner*—Joseph H Feild
*Assistant Examiner*—Daniell L Negrón
(74) *Attorney, Agent, or Firm*—Westman, Champlin & Kelly, P.A.

(57) ABSTRACT

An apparatus and method for compensation for variation in timing skew in a disc drive having at least one rotating disc is provided. A first head is positioned over a first disc surface and a second head is positioned over a second disc surface. The first disc surface includes a track having a first plurality of sectors and the second disc surface includes a track having a second plurality of sectors. Each sector of the second plurality of the sectors corresponds to a different sector of the first plurality of sectors, thereby forming a plurality of pairs of corresponding sectors. A timing skew value for each pair of corresponding sectors is computed to obtain a sequence of timing skew values. Data related to the sequence of timing skew values is utilized to compensate for variation in timing skew.

19 Claims, 10 Drawing Sheets

U.S. PATENT DOCUMENTS 6,388,413 B1 5/2002 Ng et al.
6,507,450 B1 1/2003 Elliott
6,515,813 B2 2/2003 Kitazaki et al.
6,577,463 B1 6/2003 Frees et al.
6,710,957 B2 * 3/2004 Nakasato .................... 360/51

2002/0149868 A1 10/2002 Nakasato

FOREIGN PATENT DOCUMENTS

JP 04085765 A 3/1992

* cited by examiner

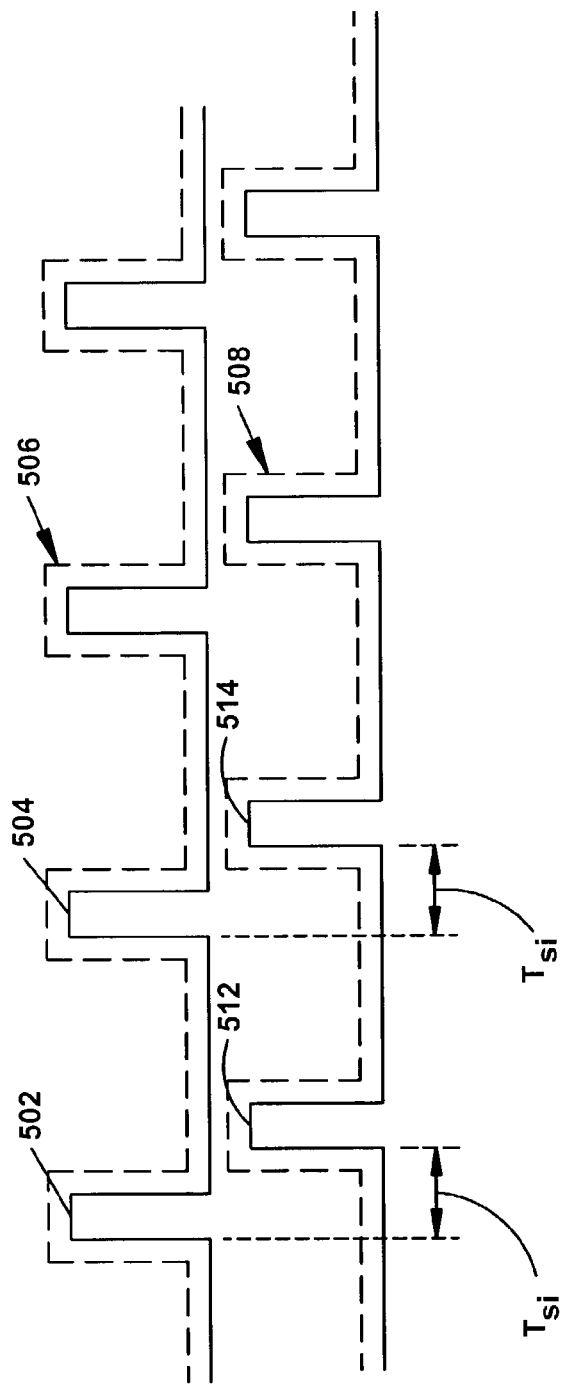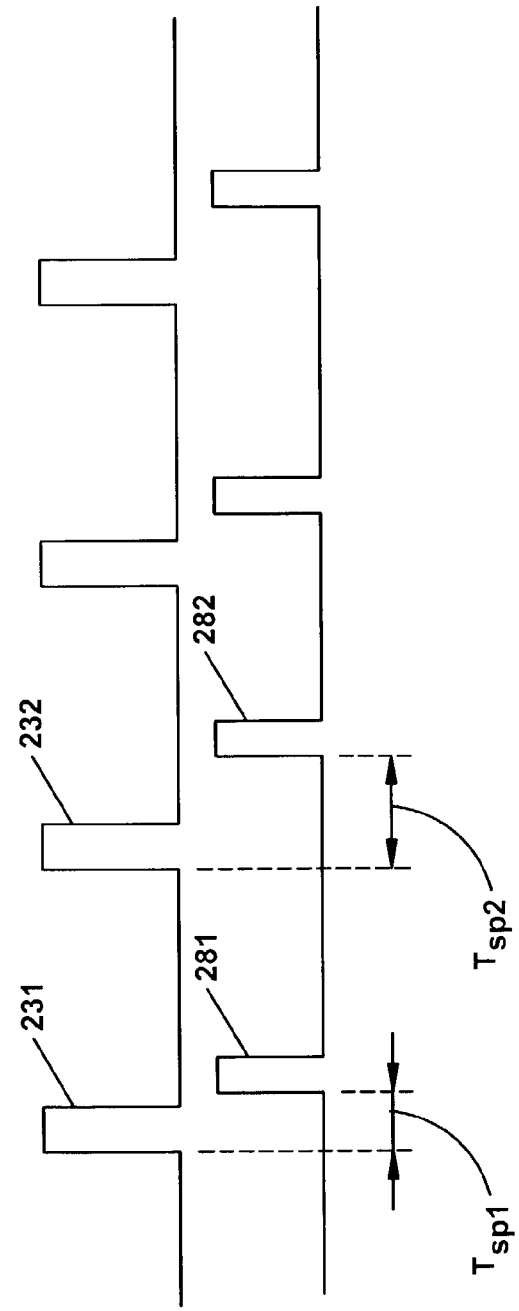
FIG. 5-1
FIG. 5-2

COMPENSATION FOR VARIATION IN TIMING SKEW IN A DISC DRIVE DATA STORAGE SYSTEM

CROSS-REFERENCE TO RELATED APPLICATION

This application claims priority from U.S. Provisional Application 60/401,100 filed on Aug. 5, 2002 for inventors Reed D. Hanson and Timothy F. Ellis and entitled "COMPENSATION FOR HEAD-TO-HEAD TIMING VARIATION ARISING IN MULTI-DISK DRIVES HAVING PRE-WRITTEN MEDIA."

FIELD OF THE INVENTION

The present invention relates generally to disc drive data storage systems. In particular, the present invention relates to compensation for variation in timing skew in a disc drive data storage system.

BACKGROUND OF THE INVENTION

Disc drives read and write information along concentric tracks formed on surfaces of one or more discs. The discs are typically mounted for rotation on the hub of a spindle motor. Axially aligned tracks on the disc surfaces are collectively referred to as a cylinder. Each of the tracks is divided into a plurality of sectors. Each of these sectors usually includes a servo field and a data field that are contiguous. The embedded servo fields are utilized by a servo sub-system to position an array of vertically aligned heads over a particular cylinder. The servo field of each sector includes a sector timing mark to verify receipt of the sector and to establish the timing between sequential sectors of a track.

In current disc drives, the servo fields are written onto the discs in-situ (that is, after the disc is mounted on the spindle motor of a disc drive) when the disc drive is manufactured and thereafter simply read by the disc drive to determine position during operation. Servo fields are written using constant frequency signals across the tracks. Thus, radially aligned servo fields occupy different linear distances in their respective tracks, but radially aligned servo fields occupy an identical timing window in each track (the angular velocity of each track is identical). Typically, in disc drives with in-situ written discs (in-situ written drives) there is a degree of misalignment between corresponding sectors (sectors that substantially overlap in a vertical direction) on different disc surfaces. This misalignment between corresponding sectors on different disc surfaces results in sector timing marks of corresponding sectors being detected by their respective heads at different time instants. For example, if the timing mark of a first sector of a first track on a first disc surface is detected at a first time instant during a particular disc revolution, the timing mark of a corresponding first sector of a first track on a second disc surface would be read at a second time instant during the same disc revolution due to the misalignment between the corresponding sectors. The difference in time between the first time instant and the second time instant is referred to as timing skew. The timing skew is constant between all corresponding sectors of any two different disc surfaces in in-situ written drives. Consequently, in in-situ written drives, the nominal timing skew value is stored in memory and utilized during head switch operations to open a timing mark search window near a timing mark that a destination head needs to detect. Thus, in in-situ written discs, the timing mark search window can be kept relatively narrow during a head switch operation.

To meet the demand for greater recording density in disc drives track writing is undergoing a fundamental change. In the near future, manufactured disc drives will include discs with tracks that are pre-written onto the disc before the discs are mounted on the spindle motor of the disc drive. When such discs with pre-written tracks (pre-written discs) are mounted on a spindle motor of a disc drive, there is a certain amount of misalignment of the track centers of the disc and the spin axis of the spindle motor. Because of such disc mounting tolerances, the tracks will be eccentric to the spindle axis of the spindle motor. One result of this servo track eccentricity is that the timing relation between heads (timing skew) is not constant as in the case of in-situ written discs but varies in a sinusoidal fashion. The magnitude of the sinusoidal timing skew has been found to be radially-dependent, that is, it varies coherently across the surfaces of the disc from the outer diameter (OD) to the inner diameter (ID). If the nominal timing value for the timing skew used in in-situ written discs is also used in the same manner for disc drives having pre-written discs, the timing-mark search window would have to be widened to account for the variation in the timing skew. Widening of the timing mark search window is undesirable since it increases the opportunity for false reads of the timing marks.

Embodiments of the present invention provide solutions to these and other problems, and offer other advantages over the prior art.

SUMMARY OF THE INVENTION

The present embodiments relate to disc drive servo systems that employ a scheme for compensating for variation in timing skew in a disc drive data storage system, thereby addressing the above-mentioned problems.

An apparatus and method for compensation for variation in timing skew in a disc drive having at least one rotating disc is provided. A first head is positioned over a first disc surface and a second head is positioned over a second disc surface. The first disc surface includes a track having a first plurality of sectors and the second disc surface includes a track having a second plurality of sectors. Each sector of the second plurality of the sectors corresponds to a different sector of the first plurality of sectors, thereby forming a plurality of pairs of corresponding sectors. A timing skew value for each pair of corresponding sectors is computed to obtain a sequence of timing skew values. Data related to the sequence of timing skew values is utilized to compensate for variation in timing skew.

Other features and benefits that characterize embodiments of the present invention will be apparent upon reading the following detailed description and review of the associated drawings.

BRIEF DESCRIPTION OF THE DRAWINGS

FIG. 2-1 is a schematic representation of a portion of the disc drive.

FIG. 2-2 is a top view of the mounted discs of FIG. 2-1.

FIGS. 5-1 and 5-2 illustrate timing skew in drives with in-situ written discs and variation of timing skew in drives with pre-written drives.

DETAILED DESCRIPTION OF ILLUSTRATIVE EMBODIMENTS

Figure 1:
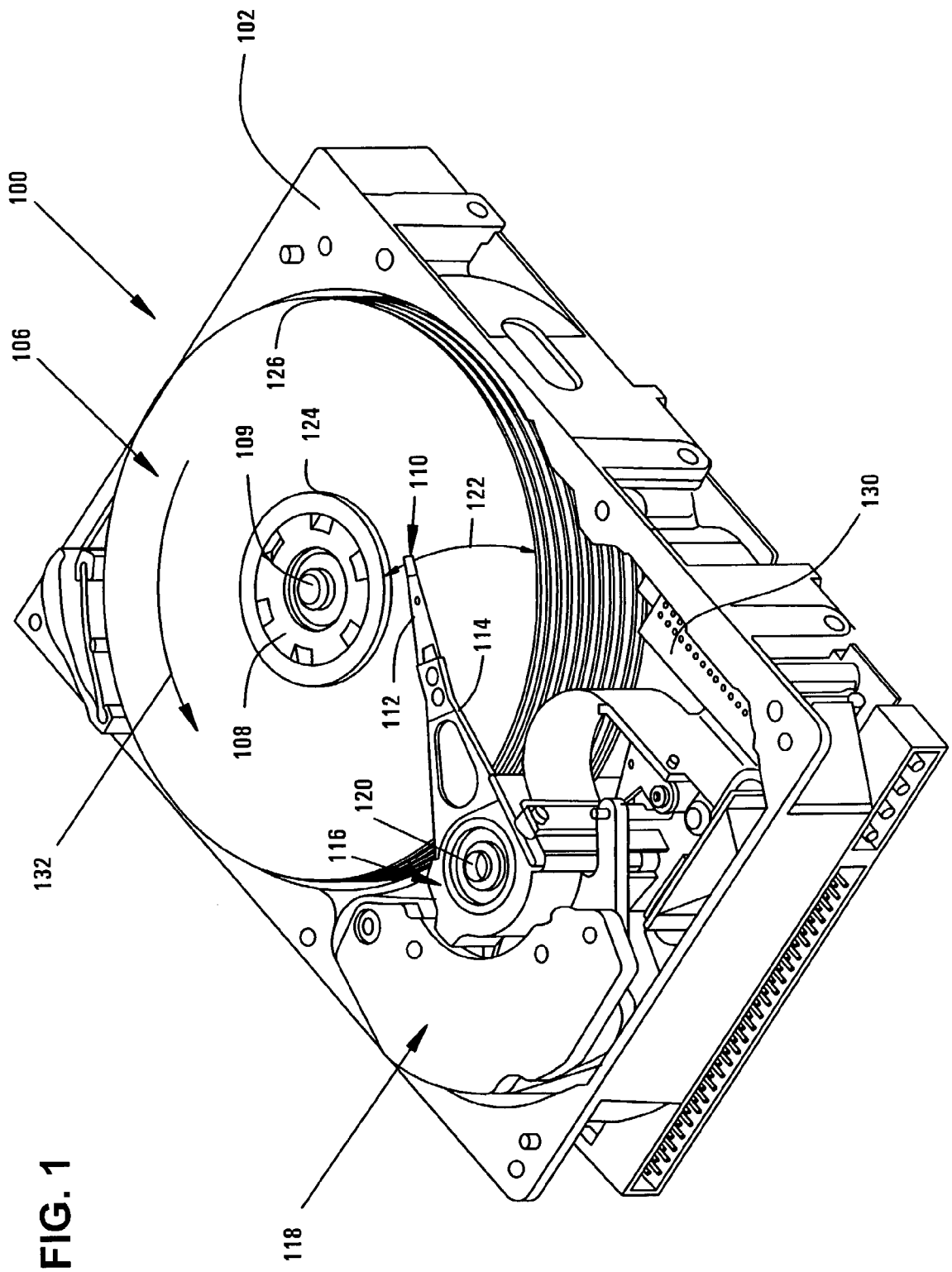
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown in FIG. 1) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figures 1, 2:
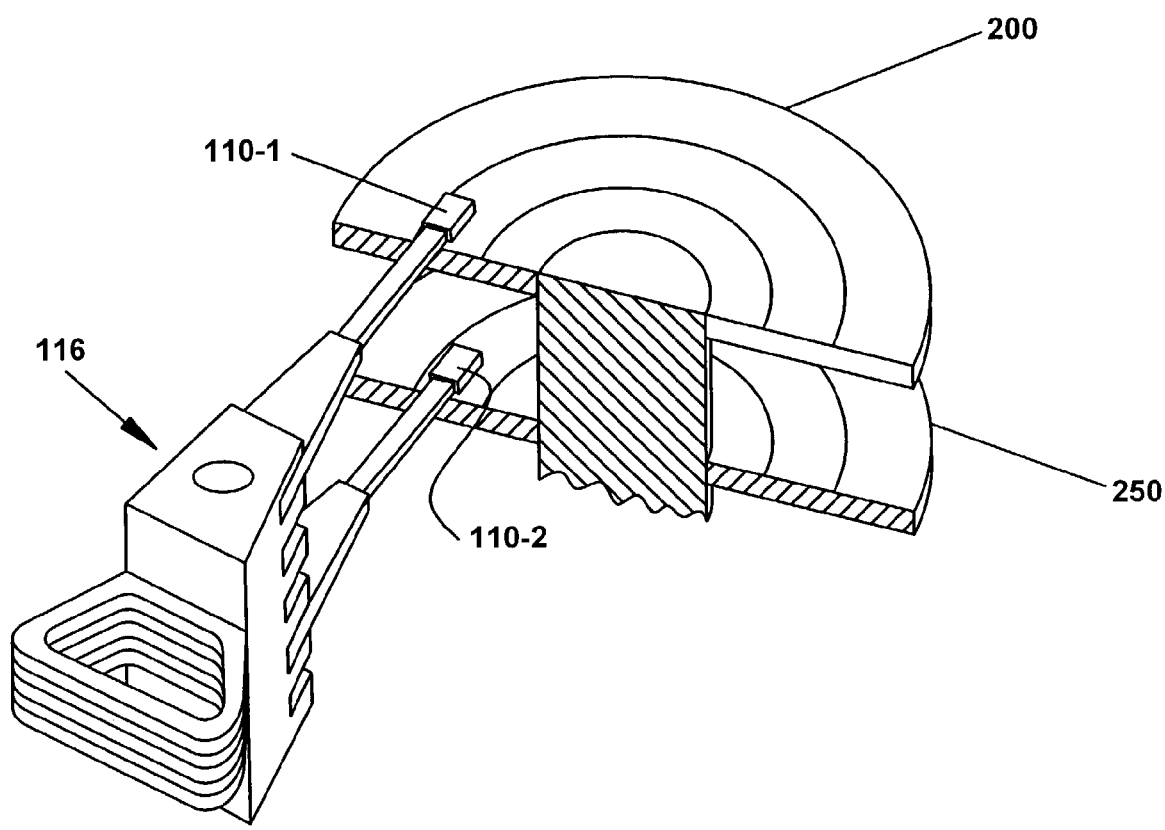
Figure 2:
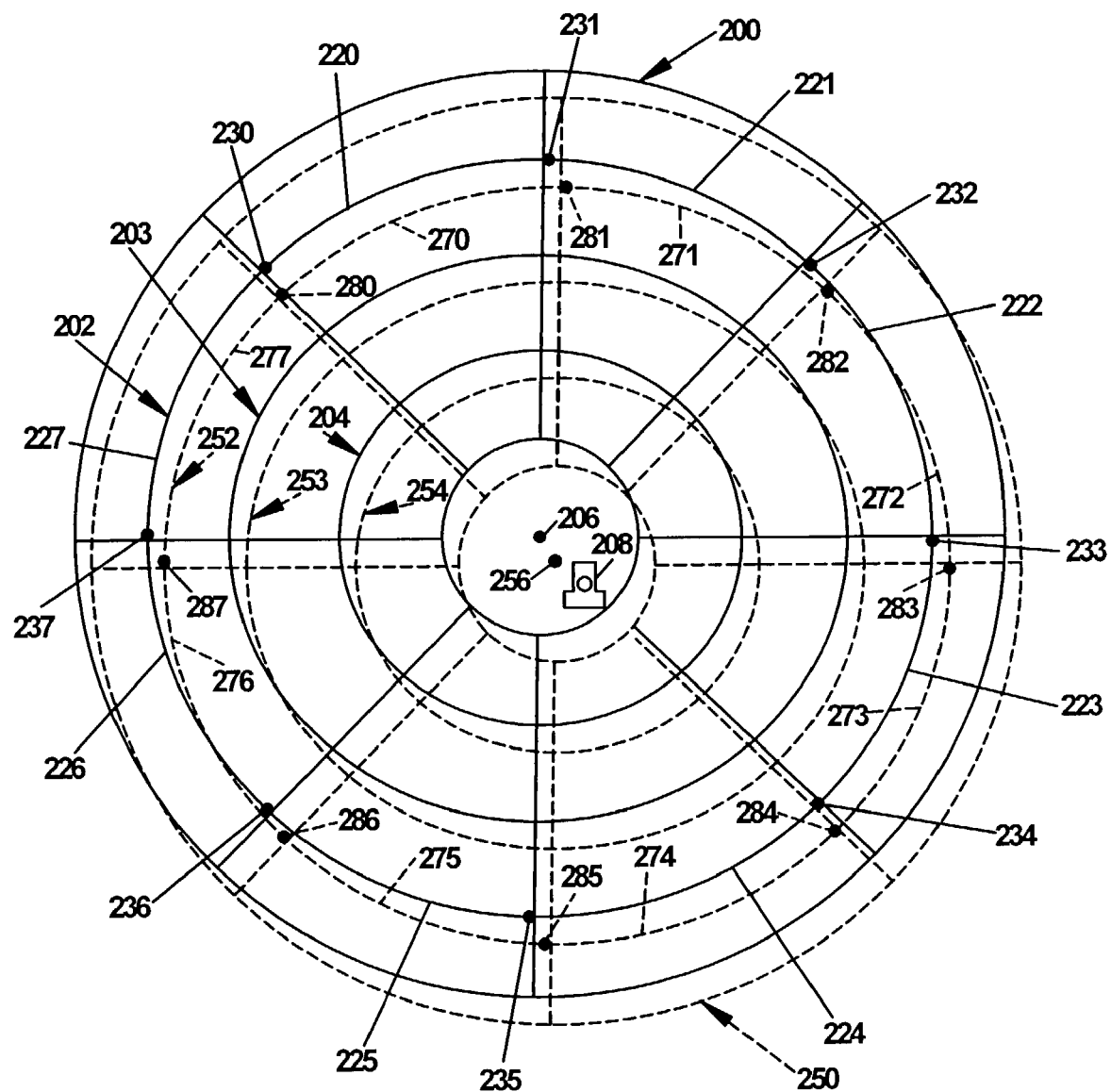

Referring now to FIG. 2-1, a schematic representation of a portion of a disc drive including pre-written discs 200 and 250 mounted on the hub of a spindle motor is shown. As can be seen in FIG. 2-1, a first head 110-1 is positioned over a surface of disc 200 and a second head 110-2 is positioned over a surface of disc 250. Heads 110-1 and 110-2 are supported by actuator 116. Each of heads 110-1 and 110-2 reads both information representative of data as well as information representative of servo or location. Details regarding surfaces of discs 200 and 250 and the communication of heads 110-1 and 110-2 with these surfaces are provided below in connection with FIG. 2-2.

FIG. 2-2 illustrates a diagrammatic top view of discs 200 and 250, with disc 250 represented in dashed lines. A surface of disc 200 includes pre-written tracks such as 202, 203 and 204 and a surface of disc 250 includes pre-written tracks such as 252, 253 and 254. As mentioned above, substantially axially aligned tracks on the disc surfaces form a cylinder. Thus, tracks 202 and 252 form a first cylinder, tracks 203 and 253 form a second cylinder and tracks 204 and 254 form a third cylinder. Tracks within the same cylinder are hereinafter referred to as corresponding tracks. The surfaces of discs 200 and 250 also include a plurality of pi-shaped consecutive sectors, numbered 220-227 and 270-277, respectively. The sectors extend radially across the tracks. A sector timing mark or pattern which is utilized to verify receipt of the sector and to establish the timing between sequential sectors, is included at the beginning of each sector of each track. For example, track 200 includes sector timing marks 230-237 and corresponding track 252 includes sector timing marks 280-287. Pre-written tracks 202, 203 and 204 have an actual track center shown by reference numeral 206 and pre-written tracks 252, 253 and 254 have an actual track center shown by reference numeral 256. As mentioned above, sectors that are substantially vertically aligned are referred to as corresponding sectors. Accordingly, sectors 220 and 270 form a pair of corresponding sectors. Similarly, sectors 221 and 271, 222 and 272, 223 and 273, 224 and 274, 225 and 275, 226 and 276, and 227 and 277 form different pairs of corresponding sectors. If the track centers of the discs 200 and 250 coincide with spin axis 208 (represented diagrammatically in FIG. 2-2) of the spindle motor, as in the case of disc drives employing in-situ discs, a degree of misalignment typically exists between each pair of corresponding sectors. The degree of misalignment between each pair of corresponding sectors in in-situ written drives is constant and therefore the timing skew (the difference in time between a first time instant at which a timing mark (such as 230) of a first sector (such as 220) of a first track (such as 202) is read by a first head (such as 110-1) during a particular disc revolution and a second time instant at which a timing mark (such as 280) of a corresponding first sector (such as 270) of a corresponding first track (such as 252) could be read by a second head (such as 110-2)) between timing marks of each pair of corresponding sectors is equal to a nominal timing skew value. However, in a disc drive with pre-written discs such as 200 and 250, an incongruity between the track centers 206 and 256 and the spindle motor spin axis 208 typically exists. Due to this incongruity, the tracks (202, 203, 204 and 252, 253, 254) are eccentric to spin axis 208 of the spindle motor. One result of the eccentricity is that the timing skew between corresponding sectors on discs 200 and 250 in not constant as in the case of in-situ written discs, but varies in a sinusoidal fashion. This variation in timing skew is also radially dependent (varies coherently across the disc surface from the OD to the ID).

Under the present invention, a scheme for compensating for variation in timing skew in a disc drive is employed. Here, compensation for variation in timing skew is carried out by computing a timing skew value between each pair of corresponding sectors to obtain a sequence of timing skew values. Data related to the sequence of timing skew values is stored and subsequently utilized to compensate for variation in timing skew in the disc drive.

Figure 3:
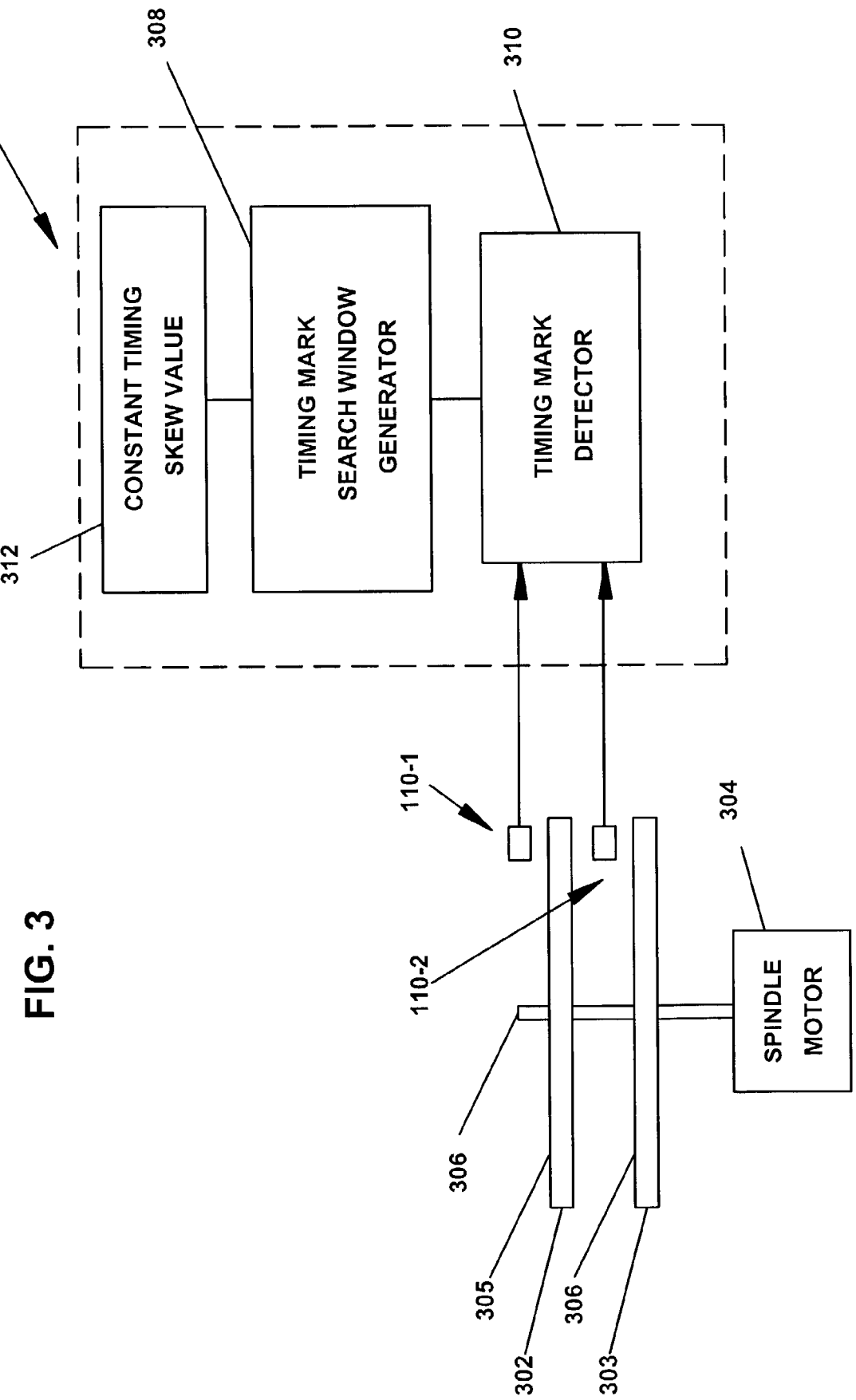
FIG. 3 is a simplified block diagram of a timing control system employed in a disc drive having in-situ written tracks.

Referring now to FIG. 3, a simplified block diagram of a timing control system 300 employed in a disc drive having in-situ written tracks is shown. Timing control system 300 is electrically coupled to heads 110-1 and 110-2 that are positioned above, and communicate with, surfaces 305 and 307 of in-situ written discs 302 and 303. Energization of spindle motor 304 causes spindle 306 and in-situ written discs 302 and 303 to rotate. Timing control system 300 includes a timing mark search window generation circuit 308 and a timing mark detection circuit 310. Based on a sample rate (the time that elapses between the detection of timing marks of any two adjacent sectors on the same disc surface), which is a nominal value for in-situ written discs, and a spindle motor speed, timing mark search window generator 308 generates waveform 506, 508 which controls timing mark detector 310 for detector 310 to compare incoming data read by head 110-1, 110-2 to a pre-established timing mark stored in timing mark detector 310. Further, since timing skew $T_{si}$ (see FIG. 5-1) is constant between timing marks such as 502 and 512, 504 and 514 (FIG. 5-1) of corresponding sectors of surfaces 305 and 307 of in-situ written discs 302 and 303, a constant timing skew value 312 is provided to timing mark search window generator 308 whenever a head switch operation takes place between heads 110-1 and 110-2. Timing mark search window generator 308 utilizes constant timing skew value 312 to adjust the position at which the timing mark search window is generated when the head switch is carried out. Thus, a relatively narrow search window can be employed by timing mark detector 310 to detect timing marks even during a head switch operation. However, if in-situ written discs 302 and 303 are replaced with a pre-written discs 200 and 250 and timing control system 300 is employed for detecting timing marks during a head switch operation, the search window will have to be widened since the timing skew $T_{sp1}$, $T_{sp2}$, etc., between timing marks 231 and 281, 232 and 282, etc., (see FIG. 5-2) of corresponding sectors, varies for pre-written discs such as 200 and 250. As mentioned above, widening of the timing mark search window increases the opportunity of false reads of timing marks. To avoid this disadvantage in disc drives with pre-written discs, timing control circuit 400 discussed below in connection with FIG. 4, is employed.

Figure 4:
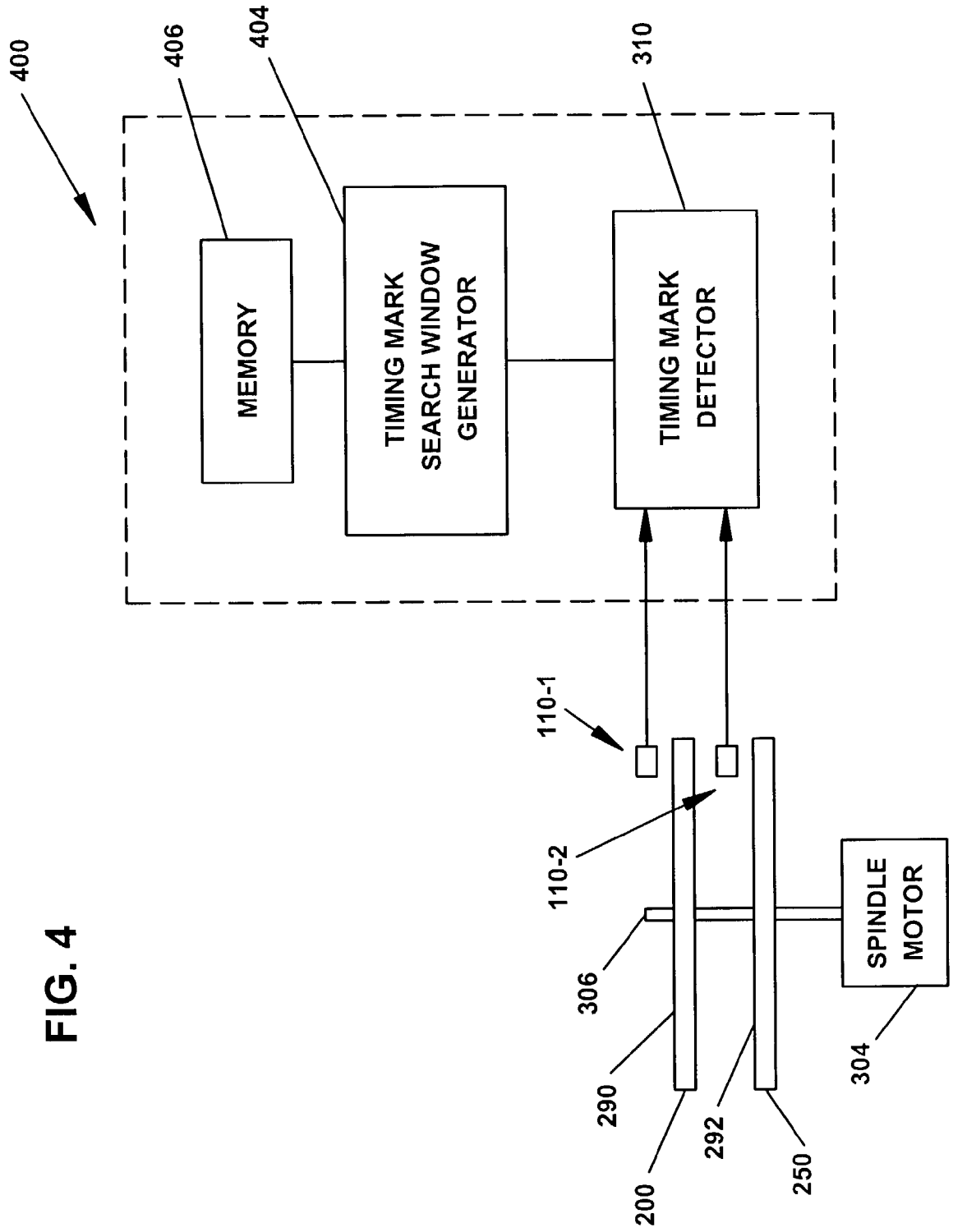
FIG. 4 is a simplified block diagram of a timing control system employed in a disc drive having pre-written tracks.

Referring now to FIG. 4, a simplified block diagram of a timing control system 400 employed in a disc drive having pre-written discs such as 200 and 250 is shown. In FIG. 4, the elements common to FIG. 3 are numbered the same. Timing control system 400 includes a timing mark search window generation circuit 404, a memory 406 and timing mark detection circuit 310. Memory 406, which may be non-volatile, includes data related to timing skew values which are computed for disc surfaces 290 and 292 of discs 200 and 250. The data related to timing skew values can be obtained either during factory calibration or start-up calibration of the drive. The data in memory 406, which also includes track identification number and sector number, is utilized by timing mark search window generator 308, during head switch operations, to generate relatively narrow timing windows that are positioned in accordance with variations in timing skew. In some embodiments, the data related to timing skew values is determined and stored for a subset of the cylinders of the discs (less then all of the cylinders of the discs). If this data is determined and stored for a subset of the cylinders and if no timing skew value data is available in memory 406 for a particular cylinder over which the heads are positioned during a head switch operation, then timing skew data associated with a cylinder closest to that cylinder is utilized by timing mark search window generator 404. Each cylinder of the subset of the cylinders for which timing skew data is determined is preferably spaced evenly apart between the inner diameter (ID) and outer diameter (OD) of the discs.

Figure 6:
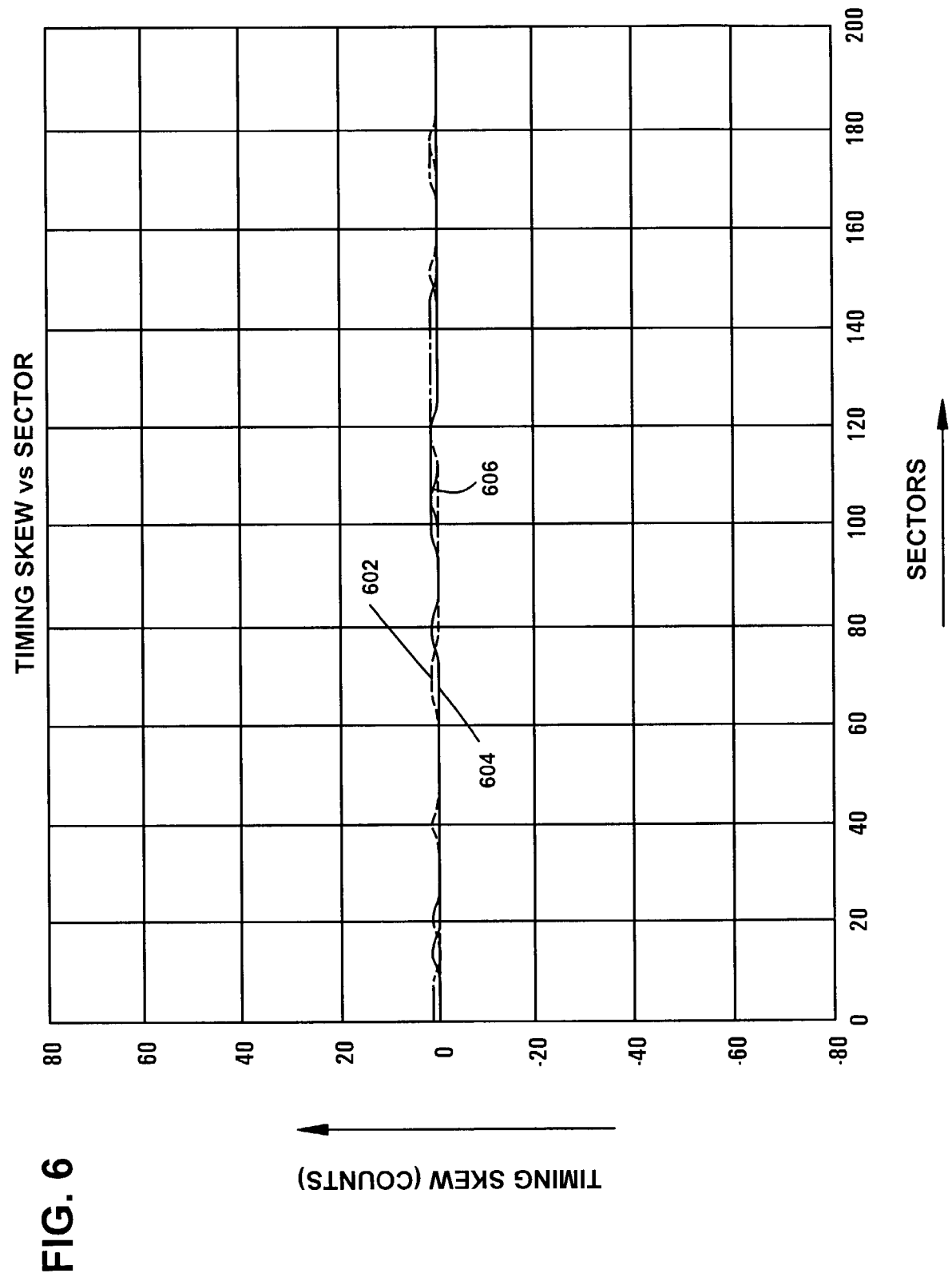
FIG. 6 is a plot of the variation in the timing skew measured in an in-situ written drive.
Figure 7:
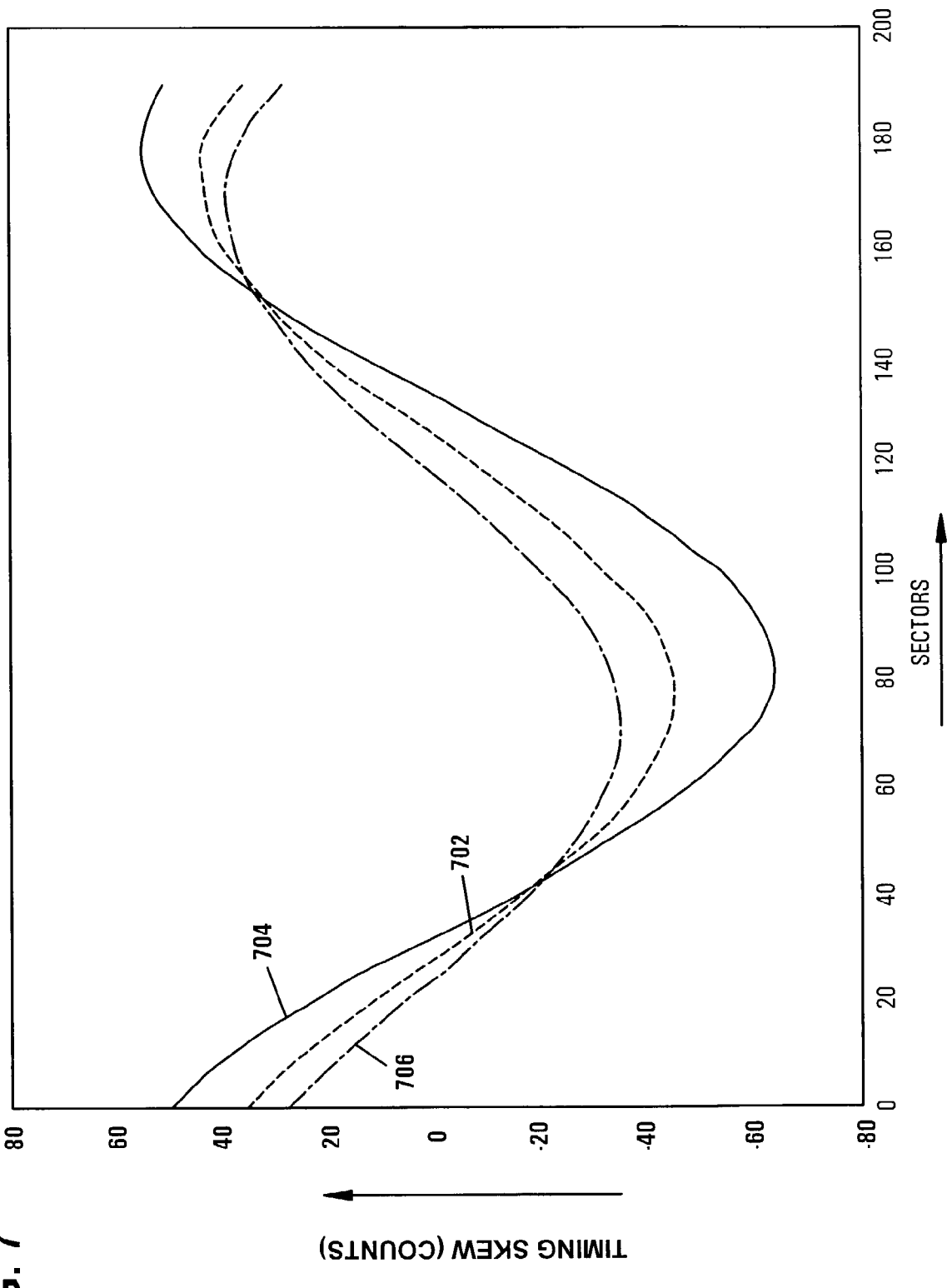
FIG. 7 is a plot showing the variation in the timing skew measured in a pre-written disc drive.

FIGS. 6 and 7 include plots illustrating the variation of timing skew in in-situ written drives and pre-written drives. FIG. 6 includes plots 602, 604 and 606 of timing skew measurements, between timing marks detected by two different heads, obtained at each sector over one spindle rotation for three different cylinders in an in-situ written drive. As can be seen in FIG. 6, the variation in timing skew is essentially zero, thereby demonstrating that the timing skew in is-situ written drives is constant. Similar plots 702, 704 and 706, obtained by direct measurement of timing skew, are shown in FIG. 7 for drives with pre-written discs. As can be seen in FIG. 7, the timing skew varies in a sinusoidal fashion over one spindle rotation. Also, the magnitude and phase of the timing skew are radially-dependent (vary coherently from the OD to the ID) as can be seen by comparing curves 702, 704 an 706 which represent timing skew measurements obtained at three cylinders spaced substantially evenly apart between the OD and the ID of the discs. An example algorithm for compensating for timing skew variation in a disc drive with pre-written discs in accordance with the present invention is described below in connection with Equation 1.

One example solution for compensating for radially-dependent sinusoidally-varying timing skew is carried out using Equation 1 below.

$$T_{skew}(k, h_d, h_s) = \left[F_s(\text{track}, h_d)\sin\left(\frac{2\pi}{N}k\right) + F_c(\text{track}, h_d)\cos\left(\frac{2\pi}{N}k\right)\right] - \left[F_s(\text{track}, h_s)\sin\left(\frac{2\pi}{N}k\right) + F_c(\text{track}, h_s)\cos\left(\frac{2\pi}{N}k\right)\right]$$

Equation 1 where $T_{skew}$ is the predicted timing skew at sector k for a head switch from source head $h_s$ to destination head $h_d$, N is the number of sectors, track is the cylinder or track number, $F_s$ is a function applied to the sine term and $F_c$ is a function applied to the cosine term. Techniques for determining $F_s$ and $F_c$ are described further below.

Figure 8:
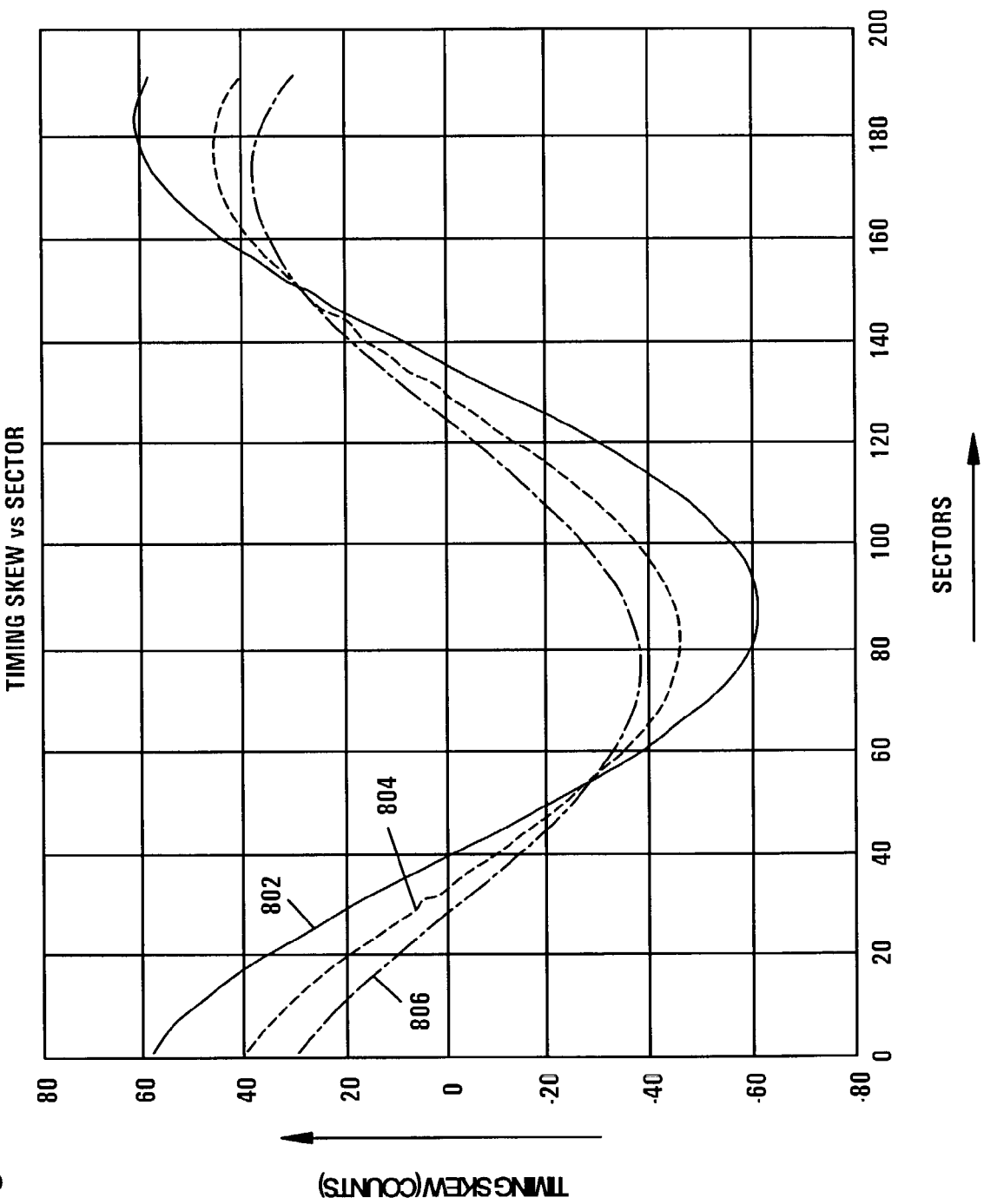
FIG. 8 is a plot showing the variation in the timing skew predicted using the compensation technique of the present invention.

FIG. 8 includes plots 802, 804 and 806 that show the variation of timing skew predicted by Equation 1 for the disc drive which was employed to carry out measurements and obtain plots 702, 704 and 706 of FIG. 7. A comparison of the plots obtained in FIG. 7 and FIG. 8 demonstrates that Equation 1 can be used to substantially accurately predict the radially-dependent sinusoidally-varying timing skew.

For this example solution, Equation 1 is evaluated during head switch and is used to open the timing mark search window near the anticipated timing mark. In this manner, the timing mark search window does not have to be widened and therefore the likelihood of reading a false timing mark is not increased. Thus, this method achieves the goal of performing head switches without having to widen the timing mark search window relative to an in-situ written drive.

Functions $F_s$ and $F_c$ in Equation 1 are implemented using either look-up tables or polynomials that are calibrated using direct measurement of the timing skew (such as the data shown in FIG. 3). Relatively accurate timing skew computations are viable using either of these techniques. An alternative approach is to scale existing polynomials that are utilized during track following and seeking operations to account for the modulation in the sample rate arising from disc eccentricity. Techniques for obtaining the polynomials used to account for variations in sample rate arising from disc eccentricity are described in U.S. application Ser. No. 10/183,680, filed Jun. 27, 2002, entitled COMPENSATION FOR TIMING VARIATION IN DISC DRIVES EMPLOYING SERVO TRACKING SYSTEMS, which is incorporated herein in its entirety. A section of U.S. application Ser. No. 10/183,680 is included below:

A least-squares polynomial fit method for determining A(track_id) and B(track_id) is descried below in connection with Equations 2 through 8. The discussion is limited to computing the coefficients for A(track_id), but the method is identical for B(track_id). Let the desired polynomial for A be described as $$A(x) = c_0 + c_1 x + c_2 x^2 + c_3 x^3$$

Equation 2 where x, the normalized track ID, is computed as $$x = \text{track\_id}/\text{track\_normalization\_constant} \quad \text{Equation 3}$$

During the calibration process, the values for a(x) are read at J predetermined track locations to form J ordered pairs $(x_i, y_i)$ where $$y_i = a@x_i \quad \text{Equation 4}$$

A least-squares solution for computing the polynomial coefficients can be computed as $$C = XY \quad \text{Equation 5}$$

where $$C = [c_0 c_1 c_2 c_3] \quad \text{Equation 6}$$

$$X = \begin{bmatrix} J & \sum_{i=1}^{J} X_i & \sum_{i=1}^{J} X_i^2 & \sum_{i=1}^{J} X_i^3 \\ \sum_{i=1}^{J} X_i & \sum_{i=1}^{J} X_i^2 & \sum_{i=1}^{J} X_i^3 & \sum_{i=1}^{J} X_i^4 \\ \sum_{i=1}^{J} X_i^2 & \sum_{i=1}^{J} X_i^3 & \sum_{i=1}^{J} X_i^4 & \sum_{i=1}^{J} X_i^5 \\ \vdots & \vdots & \vdots & \\ \sum_{i=1}^{J} X_i^n & \sum_{i=1}^{J} X_i^{n+1} & \sum_{i=1}^{J} X_i^{n+2} & \sum_{i=1}^{J} X^6 \end{bmatrix}^{-1} \quad \text{Equation 7}$$

and $$Y = \begin{bmatrix} \sum_{i=1}^{k} y_i & \sum_{i=1}^{k} x_i y_i & \sum_{i=1}^{k} x_i^2 y_i & \sum_{i=1}^{k} x_i^3 y_i \end{bmatrix}' \quad \text{Equation 8}$$

Since the x's contained within the matrix X in Equation 7 above are fixed predetermined values, the matrix X (Equation 7) can be computed offline and stored in memory. Further, matrix X (Equation 7) is common to all calculations for polynomials A(track_id) and B(track_id). Additionally, the matrix X (Equation 7) would be common for all drives within a drive platform. Thus, the least-squares polynomial fit method is adaptable and involves the storage of a relatively small amount of data. By using these existing polynomials, no additional calibration processes or stored parameters are required.

The derivation below show how the existing polynomials can be scaled to create $F_s$ and $F_c$ used in Equation 1. As described in U.S. application Ser. No. 10/183,680, the periodic sample rate can be predicted as $$T_{modulation}(k, \text{track}, h) = \quad \text{Equation 9}$$
$$A(\text{track}, h)\sin\left(\frac{2\pi}{N}k\right) + B(\text{track}, h)\cos\left(\frac{2\pi}{N}k\right) + T_{nom}$$

where h is the head number, $T_{nom}$ is the nominal sample rate and A and B are third order calibrated polynomials, which are hereinafter referred to as radially-dependent timing coefficients, that can be expressed as $$A(\text{track}, h) = a_0(h) + a_1(h)\left(\frac{\text{track}}{\text{track}_{max}}\right) + \quad \text{Equation 10}$$
$$a_2(h)\left(\frac{\text{track}}{\text{track}_{max}}\right)^2 + a_3(h)\left(\frac{\text{track}}{\text{track}_{max}}\right)^3$$

$$B(\text{track}, h) = b_0(h) + b_1(h)\left(\frac{\text{track}}{\text{track}_{max}}\right) + \quad \text{Equation 11}$$
$$b_2(h)\left(\frac{\text{track}}{\text{track}_{max}}\right)^2 + b_3(h)\left(\frac{\text{track}}{\text{track}_{max}}\right)^3$$

In Equations 10 and 11, $a_0(h)$, $a_1(h)$, etc., and $b_0(h)$, $b_1(h)$, etc., are constants for a particular head h and $\text{track}_{max}$ is the total number of tracks on a disc surface. The integration of Equation 9 leads to Equation 12 that describes the absolute time that elapses from servo sector k=0 to the $k^{th}$ sector.

$$T_{absolute}(k, \text{track}, h) = \quad \text{Equation 12}$$
$$\frac{N}{2\pi}\left[-A(\text{track}, h)\cos\left(\frac{2\pi}{N}k\right) + B(\text{track}, h)\sin\left(\frac{2\pi}{N}k\right)\right] + k * T_{nom}$$

The timing skew can then be calculated as $$T_{skew}(k, \text{track}, h_d, h_s) = T_{absolute}(k, \text{track}, h_d) - T_{absolute}(k, \text{track}, h_s) \quad \text{Equation 13}$$

Comparing Equations. 1, 12 and 13, it can be seen that functions $F_s$ and $F_c$ can be formed from radially-dependent timing coefficients A and B as $$F_s(\text{track}, h) = \frac{N}{2\pi}B(\text{track}, h) \quad \text{Equation 14}$$

$$F_s(\text{track}, h) = -\frac{N}{2\pi}A(\text{track}, h) \quad \text{Equation 15}$$

By computing $F_s$ and $F_c$ in this manner, no additional calibration process or stored parameters are required since this method involves the use of radially-dependent timing coefficients A and B which are also used for compensating for variation in sample rate. The radially-dependent timing coefficients can be obtained during a factory calibration procedure that is carried out during manufacture of the disc drive, a startup calibration procedure that is carried out during initial startup of the disc drive or a refined calibration procedure that is carried out subsequent to the initial startup of the disc drive.

Figure 9:
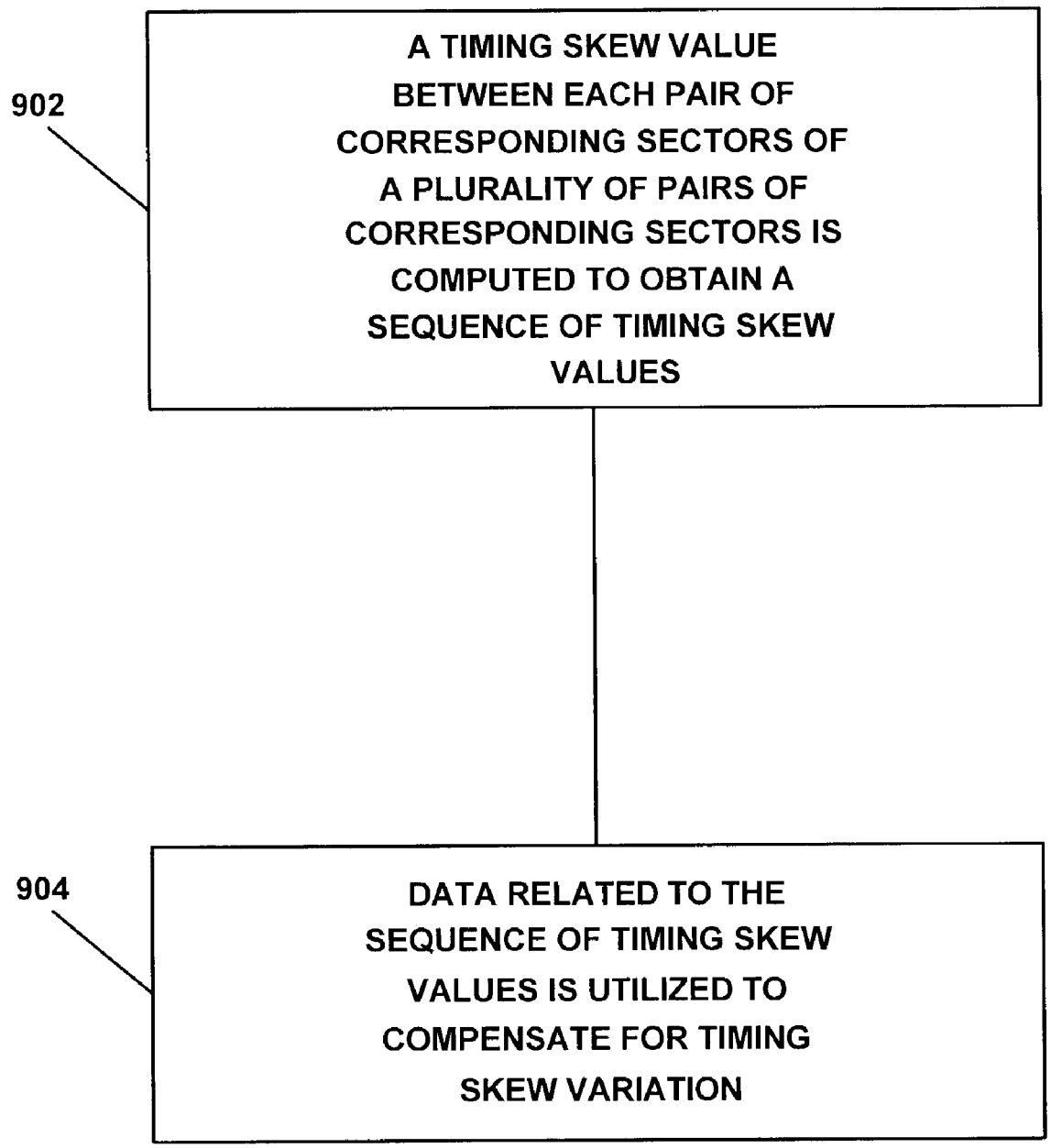
FIG. 9 is a flowchart representing a method of compensating for timing skew in accordance with an illustrative embodiment of the present invention.

FIG. 9 is a flow chart representing a method of compensating for variation in timing skew in a disc drive having at least one rotating disc. A first head is positioned over a first disc surface and a second head is positioned over a second disc surface. The first disc surface includes a track having a first plurality of sectors and the second disc surface includes a tack having a second plurality of sectors. Each sector of the second plurality of sectors corresponds to a different sector of the first plurality of sectors, thereby forming a plurality of pairs of corresponding sectors. At step 902, a timing skew value between each pair of corresponding sectors of the plurality of pairs of corresponding sectors is computed to obtain a sequence of timing skew values. At step 904, data related to the sequence of timing skew values is utilized to compensate for timing skew variation. Different techniques, some of which are set forth above, can be employed to carry out the steps shown in the flowchart of FIG. 9 while maintaining substantially the same functionality without departing from the scope and spirit of the present invention.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a compensation scheme for variation in timing skew in a disc drive data storage system, it will be appreciated by those skilled in the art that the teachings of the present invention can be applied to other systems, without departing from the scope and spirit of the present invention. Further, the compensation scheme for variation in timing skew may be implemented in hardware or software. The disc drive can be based upon magnetic, optical, or other storage technologies and may or may not employ a flying slider. Also, the teachings of the present invention are applicable whenever there is variation in timing skew. For example, when misalignment between the spin axis and the track center occurs in an in-situ drive due to shock, the compensation scheme of the present invention can be utilized for correcting the resulting timing skew variation.

What is claimed is:

1. A method of compensating for variation in timing skew in a storage device, the method comprising:
    (a) computing timing skew values for corresponding sectors on surfaces of discs in the storage device;
    (b) storing, independently of the discs in the storage device, polynomials related to the timing skew values in a memory that is separate from the discs in the storage device; and
    (c) utilizing the polynomials to compensate for timing skew variation.

2. The method of claim 1 wherein the memory that is separate from the discs in the storage device is a non-volatile memory.

3. The method of claim 1 wherein the utilizing step (c) further comprises generating at least one timing mark search window as a function of the polynomials to thereby detect at least one timing mark on a disc surface of the disc surfaces during a head switch operation.

4. The method of claim 1 wherein the polynomials are computed from a matrix.

5. The method of claim 1 wherein the polynomials related to the timing skew values are determined from a calibration procedure.

6. The method of claim 5 wherein the calibration procedure is a factory calibration procedure that is carried out during manufacture of the storage device.

7. The method of claim 5 wherein the calibration procedure is a start-up calibration procedure that is carried out during initial start-up of the storage device.

8. The method of claim 5 wherein the calibration procedure is a refined calibration procedure that is carried out subsequent to the initial start-up of the storage device.

9. A storage device comprising:
    discs having surfaces; and
    a timing control system adapted to compensate for variation in timing skew by:
        computing timing skew values for corresponding sectors on the surfaces of the discs;
        storing, independently of the discs in the storage device, polynomials related to the timing skew values in a memory that is separate from the discs in the storage device; and
        utilizing the polynomials to compensate for timing skew variation.

10. The storage device of claim 9 wherein the timing control system is further adapted to utilize the polynomials by generating at least one timing mark search window as a function of the polynomials to thereby detect at least one timing mark on a disc surface of the disc surfaces during a head switch operation.

11. The storage device of claim 9 wherein the memory that is separate from the discs in the storage device is a non-volatile memory.

12. The storage device of claim 9 wherein the timing control system is further adapted to compute the polynomials from a matrix.

13. The storage device of claim 12 wherein the timing control system is further adapted to determine the polynomials from a calibration procedure.

14. The storage device of claim 13 wherein the calibration procedure is a factory calibration procedure that is carried out during manufacture of the storage device and wherein the timing control system is adapted to determine the polynomials from the factory calibration procedure.

15. The storage device of claim 13 wherein the calibration procedure is a start-up calibration procedure that is carried out during initial start-up of the storage device and wherein the timing control system is adapted to determine the polynomials from the start-up calibration procedure.

16. The storage device of claim 13 wherein the calibration procedure is a refined calibration procedure that is carried out subsequent to the initial start-up of the storage device and wherein the timing control system is adapted to determine the polynomials from the refined calibration procedure.

17. The storage device of claim 9 wherein the timing control system comprises a timing mark search window generation circuit and a timing mark detection circuit.

18. A disc drive comprising:
    at least one disc having at least two surfaces with a first head position over a first surface and a second head positioned over a second surface, the first surface including a track having a first plurality of sectors and the second surface including a track having a second plurality of sectors, each sector of the second plurality of sectors corresponding to a different sector of the first plurality of sectors, thereby forming a plurality of pairs of corresponding sectors; and a timing skew control means, using information stored in a memory separate from the at least one disc, for compensating for variation in timing skew values associated with the pairs of corresponding sectors, wherein the timing skew control means comprises a timing control system adapted to compensate for variation in timing skew by:
- computing a timing skew value for each pair of corresponding sectors to obtain a sequence of timing skew values; and
- storing, independently of the discs in the storage device, polynomials related to the sequence of timing skew values in the memory that is separate from the discs in the storage device, wherein the polynomials constitute the information in the memory; and
- utilizing the polynomials to compensate for timing skew variation.

19. The disc drive of claim 18 wherein the timing skew control system is further adapted to utilize the polynomials by generating at least one timing mark search window as a function of the polynomials to thereby detect at least one timing mark on the second disc surface during a head switch operation from the first head positioned over the first disc surface to the second head positioned over the second disc surface.

* * * * *